United States Patent [19]

Porath

[11] 4,455,816
[45] Jun. 26, 1984

[54] PEDAL OPERATED MOWER

[76] Inventor: Deanna F. Porath, P.O. Box 7464, Montgomery, Ala. 36107

[21] Appl. No.: 393,408

[22] Filed: Jun. 29, 1982

[51] Int. Cl.$^3$ ............................................. A01D 53/02
[52] U.S. Cl. ........................................... 56/249; 56/2
[58] Field of Search ........................... 56/249, 2, 13.5; 280/261

[56] References Cited

U.S. PATENT DOCUMENTS

| | | | |
|---|---|---|---|
| 613,834 | 11/1898 | Burnet | 56/249 |
| 1,250,665 | 12/1917 | Rossi | 280/261 |
| 1,713,396 | 5/1929 | Rountree | 56/249 |
| 2,715,810 | 8/1955 | Beneke | 56/249 |
| 4,341,058 | 7/1982 | Chun | 56/2 |

FOREIGN PATENT DOCUMENTS 157867  7/1954  Australia ............................... 56/249
113429  12/1968  Norway ................................. 56/249

Primary Examiner—J. N. Eskovitz
Attorney, Agent, or Firm—Harvey B. Jacobson

[57] ABSTRACT

A tricycle frame providing basic support for the pedal operated mower, pedals turning a forward sprocket for providing locomotion, the locomotion communicating by a chain to turn a rear sprocket mounted on a shaft having a set of split cutting blades peripherally disposed about the cutting shaft for turning the shaft and cutting blades, and gear means connecting the cutter shaft with rear wheels of the tricycle frame and resulting in the locomotion thereof. A protective shield is mounted on the tricycle frame to protect the operator from debris thrown up during the course of mowing, and also a set of goose neck handle bars, an appropriate sized front wheel and a large triangular padded seat are also provided in the combination.

8 Claims, 3 Drawing Figures

Blade

Gap for rear sprocket

PEDAL OPERATED MOWER

BACKGROUND OF THE INVENTION

1. Field of the Invention

The present invention relates to a pedal operated mower mounted on a tricycle frame as a basic support structure for the mower, and more particularly, the invention relates to a pedal and sprocket arrangement driven by the operator of the tricycle for driving a rear sprocket which turns a cutter blade assembly mounted on a shaft or axle, the rear wheels of the tricycle frame being driven in turn through a gear train driven by the axle on which cutter blades are mounted, the cutter blades having a space at a midportion thereof for a chain coupling the front and rear sprockets so the blades can pass in motion. Also, protective devices and shields are mounted on the tricycle frame to protect the operator from debris created during the cutting process and operation.

2. Description of the Prior Art

Various prior art and U.S. patents relate to mowers and to motor operated arrangements, and of interest to the present invention are the following U.S. patents:

U.S. Pat. No. 2,705,393—Apr. 5, 1955—Cofer
U.S. Pat. No. 2,828,827—Apr. 1, 1958—Chouinard
U.S. Pat. No. 3,880,449—Apr. 29, 1975—Wado.

The patent to Chouinard discloses a riding attachment for a power-driven implement such as a power lawn mower and the like wherein a clutch may be engaged whereupon the operator may, by operating the pedals, cause one or more of the wheels of the riding attachment to be driven in either direction. The other patents are of general interest. None of these patents discloses all of the specific details of the present invention in such a way as to bear upon the patentability of any claims of the present invention.

SUMMARY OF THE INVENTION

An object and advantage of the present invention is to provide a pedal operated mower that does not consume fuel or make noises corresponding to engines for mowers, but provides an arrangement that is conveniently an exercising assembly for operators, both young and old.

Another object and advantage of the present invention is to provide a man powered machine in which the operator need not be required to start an engine and to endanger pulling his arm out of socket in order to crank the mower, but the invention provides a tricycle frame and pedal operated mower arrangement so that a young person or an older person is capable of operating the assembly for purposes of conveniently cutting the grass while at the same time obtain exercise while grooming the yard.

A further object of the present invention is to provide a tricycle frame and pedal arrangement for driving rotary cutter blades, the chain and sprocket assembly being spaced between the cutter blades about a central portion thereof and for providing protective shields mounted on the tricycle frame protecting the operator from debris passing through and being cut by the mower assembly. A front wheel for steering, a triangular padded seat and goose neck handle bars are provided to provide necessary and adequate control of the tricycle frame assembly during operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
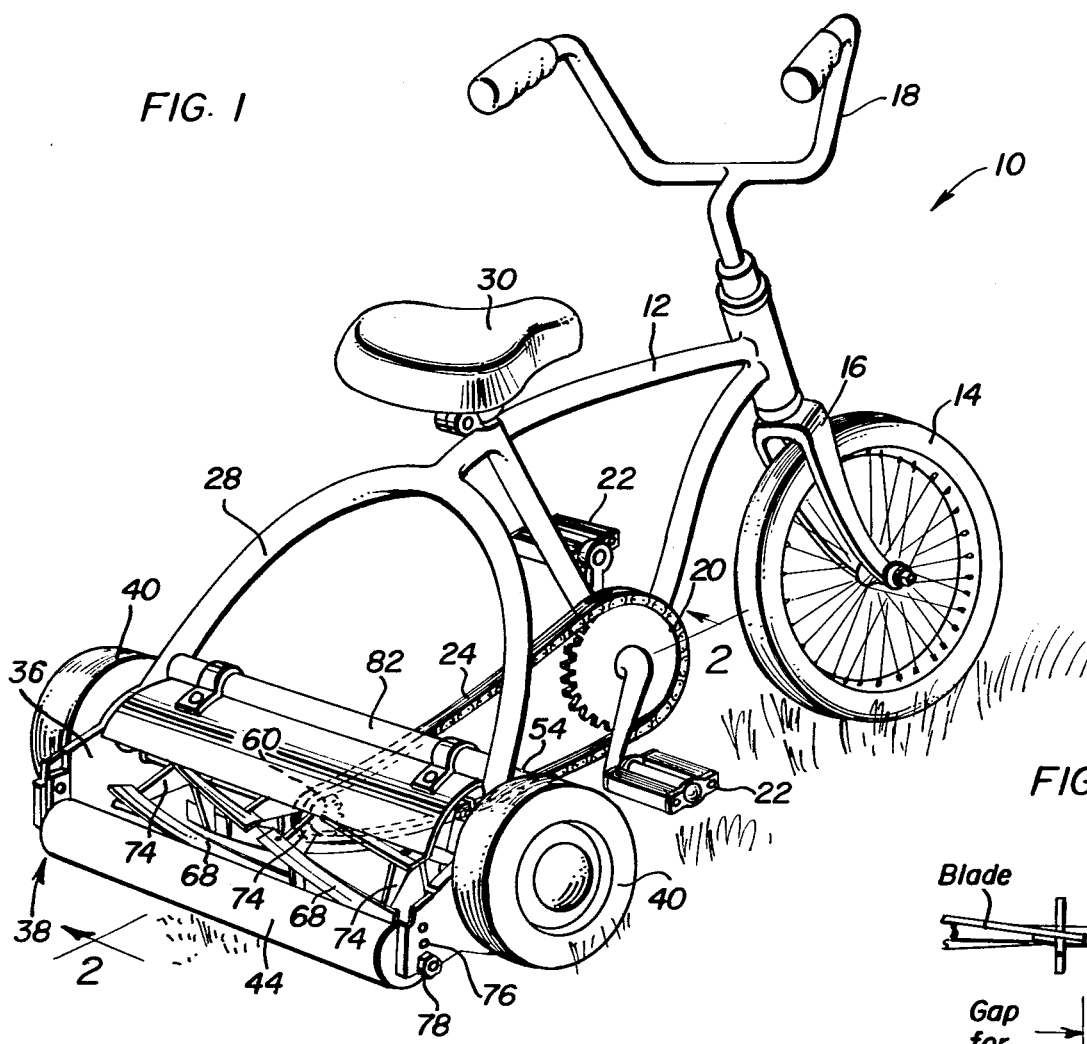
FIG. 1 is a perspective view of a rear side view of the pedal operated mower of the present invention.
Figure 3:
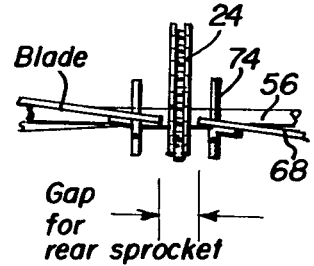
FIG. 3 is a fragmented sectional view showing the mower shaft with the cutter blades split and appropriately spaced to accommodate a rear sprocket and chain assembly coupled to the pedal operated sprocket gear.
Figure 2:
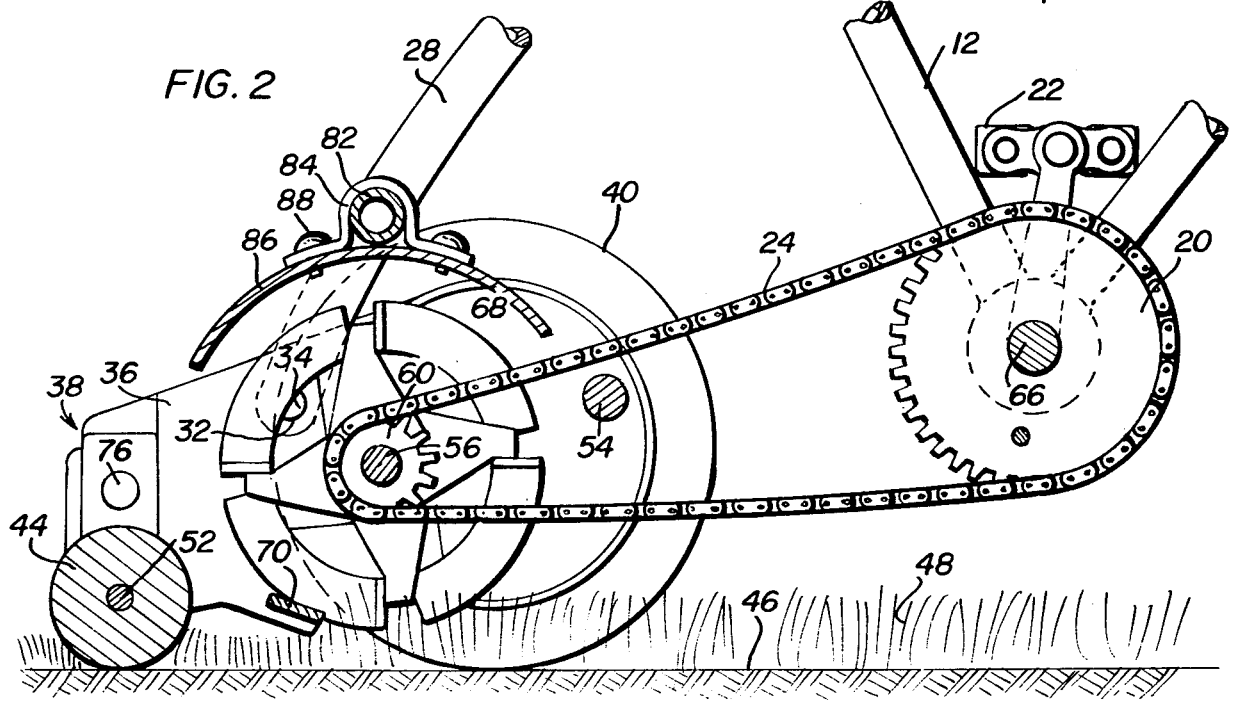
FIG. 2 is a sectional view taken along the line 2—2 of FIG. 1.

Referring now to the drawings, there is shown a pedal operated mower 10 including a tricycle frame 12 having a front wheel 14 mounted from a single wheel fork 16 and having its fork shaft extending through the tricycle frame 12 to engage with a set of goose neck handle bars 18, the tricycle frame further including and supporting a pedal sprocket 20 having a set of spaced pedals 22, the sprocket carrying a chain 24, the tricycle frame further including a wide fork structure or member 28 posterior or rear of a triangular padded seat 30 for supporting an operator sitting on the seat and can actuate the pedals 22 in conventional fashion.

Each of the legs forming the wide fork member 28 terminates in a pivot aperture or recess opening 32 for engaging with a circular member or pivot 34 mounted on the interior surfaces of spaced side plates 36 of a mower wheel assembly 38. At the forward portion of the side plates 36, there is mounted for rotation a set of rear wheels 40 which make up the tri-mower assembly cooperating with front wheel 14 as shown. The rear portion of the side plates 36 carries an adjustably positioned roller member 44, and the wheels 40 with the roller 44 each are provided for engaging generally a planar surface such as the ground 46 which may be a lawn or grass seeded area 48 desired to be cut by the pedal operated mower 10 of the present invention.

The various portions of the side plates 36 are structurally equispaced from each other by the shaft 52 on which the roller 44 is mounted, by a support rod 54 spaced between forward portions of the side plates 36 and by a rotatable cutter blade shaft 56 having the ends thereof passing through the side plates 36 and engaging with a pinion (not shown) for engaging internal gear member (not shown) associated with the mower wheels 40. Both the pinion and the internal gear are well known and are of conventional construction and arrangement. At a midportion of the cutter blade shaft 56 is a rear sprocket 60 having teeth engaged by the endless chain 24. A plurality of spiral cutter blades 68 are rigid with shaft 56 to form a reel type mower assembly.

By turning the pedals 22 on the sprocket 20 about its pivot 66, the chain 24 turns the sprocket 60 and its shaft 56 together with the associated mower cutter blades 68 and, each of the sprockets 20, 60 turning in a clockwise direction turn the cutter blades 68 in a clockwise direction for engaging grass 48 directed onto the cutter member 70 to cut the grass in a conventional manner. Rotation of the shaft 56 is also in a clockwise direction along with the reel assembly and wheels 40 so that the tricycle assembly is driven forwardly to the right as shown in the drawings.

The construction and arrangement of the cutter blades 68 is well known with their ends being supported by a spider 74 shown adjacent the side plates 36 as well as shown adjacent the rear sprocket 60 extending from the shaft 56 outwardly to ends of the blades 68. The blades 68 are disposed in a spiral or helical arrangement about the shaft 56 and together with the spiders 74 adjacent the rear sprocket 60, there is formed a space sufficient to allow the chain 24 to pass around the sprocket 60 and be driven by the sprocket 20 as described above, the cutter element 70 extends from and is mounted by the side plates 36, can be dismantled for sharpening and replacement, and adjustment is provided for raising or lowering the cutter member 70 so that the blades 68 cooperate with the cutter member 70 in grass cutting. Similarly, adjustment is made to positioning the roller 44 on its shaft 52 by selectively placing the shaft 52 in any of the corresponding openings or apertures 76 and the shaft is retained in place by tightening the bolt 78.

Spanning from one side to the other of the spaced side plates 36 of the wide fork member 28 is a protective member support bar 82 for mounting a U-shaped bracket 84 for supporting a concave protective shield 86 by rivets 88 or the like. The protective shield 86 is mounted and arranged to protect the operator riding or sitting on the seat 30 from debris and grass cuttings that are dispensed and thrown generally upwardly as the pedal operated mower 10 passes along the ground surface 46. The radius of curvature of the protective shield 86 has a center proximate to or identical with a circle having a center at the axis of the shaft 56. Any material that is deflected against the shield 86 may fall again into the rotary path of the cutter blades 68 and if they engage contact between the cutter blades 68 and the cutter member 70, they may again be cut reducing the cuttings into smaller components.

It is further within the purview of the present invention to provide that the rear wheels 40 may be mounted along a common shaft (not shown) on which is mounted a sprocket similar to rear sprocket 60 for drivingly engaging the wheel shaft, and the wheels would then be connected for separately driving the cutter blades 68 mounted on their common shaft such as shaft 56 which is mounted and displaced rearwardly from the wheel shaft (not shown) and by this arrangement comparable results in exercise, operation of the pedal operated mower 10 by an operator who is desirous of acquiring exercise while trimming the yard. By using a conventional reel-type mower assembly, except for the gap for the sprocket gear and chain, a pedal operated mower may be provided with the lowest possible construction cost. The pedal operated mower 10 is a man-powered machine in which the operator will not need to have to pull his arm abruptly in order to crank an engine for a mower, where an operator is quite young or an elderly person and thus conserving natural resources and energy, but yet providing a means to obtain exercise while grooming the yard during the process of cutting the grass. The pedal operated mower is a quiet and efficient structure providing exercise regardless of age, and since the pedal operated mower 10 is primarily an exercise man-powered machine, any uncut grass due to the spacing between the cutter blades 68 proximate the rear sprocket 60 is easily handled by running the pedal operated mower 10 again over that portion of any uncut grass passed by the space between the cutter blades 68. A goose neck handle bars 18 provides for the operator's knees to not impact against the structure of the handle bars 18 and ease of steering of the tri-mower, pedal operated mower is obtained. The operator sits on a large triangular constructed padded seat 30 and it accordingly may be further padded for extra comfort and ease while the pedal operated mower 10 passes over rough terrain.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pedal operated mower assembly comprising a tricycle frame having a front wheel mounted in a fork, a central frame mounting a pedal sprocket and a wide fork frame at the rear supporting a reel-type mower assembly, the mower assembly having spaced support plates mounted on the wide fork frame, the support plates supporting a shaft having a rear sprocket about a midpoint of the shaft for chain engagement with the pedal sprocket, separate arrays of cutter blades spaced about the shaft on opposite sides of the rear sprocket respectively, said arrays of blades being mounted upon the shaft for rotation therewith and defining a gap therebetween in which is located the rear sprocket, a drive chain connecting the pedal sprocket and the rear sprocket, the drive chain being received in said gap, and a cutter member cooperating with the cutter blades for providing mowing of the grass.

2. The invention according to claim 1 wherein the support plates further support a roller shaft on which is mounted a roller positioned rearwardly of the cutter member.

3. The invention according to claim 1 wherein a protective shield is mounted on rod means above the cutter blades on the wide fork frame, the protective shield having a radius of curvature with its radius centered proximate the radius of the shaft mounting the cutter blades.

4. The invention according to claim 1 wherein the tricycle frame includes a wide seat being mounted on the tricycle frame, and handle bars are mounted by a goose neck means extending upwardly from the front wheel fork.

5. The invention according to claim 1 wherein the support plates for the mower assembly are pivotally mounted upon the tricycle frame and the support plates are rigidly spaced apart by a shaft for the roller, by the shaft for the rear sprocket and for mounting the cutter blade, and by a spacer rod.

6. A pedal operated mower arrangement comprising a frame, steerable front wheel means mounted on the frame, a pedal driven sprocket mounted on the frame, a reel-type mower assembly including drive wheels mounted adjacent the rear of the frame, a rear sprocket centrally mounted thereon in alignment with the pedal driven sprocket and having a sprocket chain drivingly connecting the sprockets, a seat on the frame to support an operator, steering control means on the frame accessible to an operator on the seat and connected with the steerable front wheel means, and means drivingly connecting the rear sprocket to the mower assembly including the drive wheels, wherein the mower assembly includes a cutter blade shaft, with the rear sprocket centrally mounted thereon and separate arrays of mower blades mounted on the shaft on opposite sides of the sprocket respectively, said arrays defining a gap therebetween accommodating the sprocket and the sprocket chain.

7. The invention according to claim 6 wherein a rod is mounted above the mower assembly, a protective shield rigidly attached to the rod for deflecting cut material away from the operator of the pedal operated mower.

8. The invention according to claim 6 wherein said frame includes a rear fork including a pair of rear and downwardly extending rigid legs having the mower assembly mounted therebetween, said front wheel means includes a single front wheel, a front fork journalling the front wheel for rotation about a central axle and for pivotal movement about an upwardly extending axis at the front thereof, said steering control means includes handle bars connected to the front fork.

* * * * *